United States Patent
Leach et al.

(10) Patent No.: US 7,145,097 B2
(45) Date of Patent: Dec. 5, 2006

(54) METHOD AND APPARATUS FOR ELECTRICAL RESISTANCE SPOT WELDING USING ELECTRICAL SERVO ACTUATOR

(75) Inventors: Kenneth R. Leach, Clarkston, MI (US); John R. Pippin, Jr., Royal Oak, MI (US)

(73) Assignee: Milco Manufacturing Co., Warren, MI (US)

( * ) Notice: Subject to any disclaimer, the term of this patent is extended or adjusted under 35 U.S.C. 154(b) by 218 days.

(21) Appl. No.: 10/774,129

(22) Filed: Feb. 6, 2004

(65) Prior Publication Data

US 2004/0173578 A1    Sep. 9, 2004

Related U.S. Application Data

(60) Provisional application No. 60/445,035, filed on Feb. 6, 2003.

(51) Int. Cl.
*B23K 11/24* (2006.01)

(52) U.S. Cl. .................. 219/110; 219/86.51
(58) Field of Classification Search ............... 219/110, 219/86.41, 86.51
See application file for complete search history.

(56) References Cited

U.S. PATENT DOCUMENTS

| | | | |
|---|---|---|---|
| 2,021,477 A | 11/1935 | Bohn | 219/108 |
| 2,306,593 A | 12/1942 | Collom | 219/110 |
| 2,349,835 A | 5/1944 | Strickland, Jr. | 219/89 |
| 2,415,082 A | 2/1947 | Hurr | 219/86.15 |
| 2,472,368 A * | 6/1949 | Cox et al. | 219/86.51 |
| 2,474,816 A | 7/1949 | Briggs | 219/4 |
| 3,396,260 A | 8/1968 | Waltonen | 219/89 |
| 3,889,094 A | 6/1975 | Needham | 219/89 |
| 4,419,558 A | 12/1983 | Stiebel | 219/109 |
| 4,447,697 A | 5/1984 | Dunne et al. | 219/86.41 |
| 4,473,734 A | 9/1984 | Henry | 219/86.8 |
| 4,504,725 A | 3/1985 | Beneteau | 219/86.25 |
| 4,517,435 A | 5/1985 | Humblot | 219/89 |
| 4,550,236 A | 10/1985 | Nakadate et al. | 219/86.31 |

(Continued)

OTHER PUBLICATIONS

Ariel Stiebel, Charles Ulmer, Dietrich Kodrack, Barry Homes, "Monitoring and Control of Spot Weld Operations," SAE Technical Paper Series #860579, International Congress and Exposition, Detriot, MI, Feb. 24-28, 1986.

*Primary Examiner*—Clifford C. Shaw
(74) *Attorney, Agent, or Firm*—Gifford, Krass, Groh Sprinkle, Anderson & Citkowski, PC

(57) ABSTRACT

The present invention provides a servo driven spot welder where an electric servo actuator moves at least one of two electrodes to and away from the workpiece. The servo driven spot welder includes a controller that allows accurate control of the position of one of the electrodes such that fine adjustments may be made during the welding event. A power source is provided in communication with the actuator, the controller and the electrodes whereby the controller controls the delivery of power to the actuator for movement and to the electrodes for welding. A sensing device is provided between the servo drive and the electrode for sensing the load on the electrode during the welding event. The sensing device senses when a weld nugget forms on the workpiece and expands to cause an increase in the load and then becomes plastic to cause a decrease in the load. The controller operates to receive a signal from the sensing device that is indicative of the load change at the electrodes and to stop providing weld power to the electrodes when the weld nugget becomes plastic.

19 Claims, 2 Drawing Sheets

U.S. PATENT DOCUMENTS

| | | | |
|---|---|---|---|
| 4,551,605 A | 11/1985 | Numata et al. | 219/86.31 |
| 4,684,778 A | 8/1987 | Cecil | 219/116 |
| 4,771,160 A | 9/1988 | Pitsch et al. | 219/90 |
| 4,947,017 A | 8/1990 | Beck | 219/86.25 |
| 4,985,612 A | 1/1991 | Izume et al. | 219/116 |
| 5,099,099 A | 3/1992 | Saito | 219/89 |
| 5,113,053 A | 5/1992 | Umeda et al. | 219/116 |
| 5,117,337 A | 5/1992 | Sakuma | 296/97.5 |
| 5,225,647 A | 7/1993 | Dufrenne | 219/86.51 |
| 5,252,801 A | 10/1993 | Angel et al. | 219/86.61 |
| 5,254,828 A * | 10/1993 | Stiebel | 219/110 |
| 5,340,960 A | 8/1994 | Takasaki et al. | 219/86.7 |
| 5,386,092 A | 1/1995 | Dufrenne | 219/86.32 |
| 5,405,075 A | 4/1995 | Narita et al. | 228/102 |
| 5,412,172 A | 5/1995 | Ichikawa et al. | 219/86.41 |
| 5,504,297 A | 4/1996 | Steibel et al. | 219/89 |
| 5,528,011 A | 6/1996 | Kono et al. | 219/86.41 |
| 5,582,747 A | 12/1996 | Sakai et al. | 219/86.41 |
| 5,789,719 A | 8/1998 | Pary et al. | 219/86.25 |
| 5,928,531 A | 7/1999 | Sato et al. | 219/86.25 |
| 6,232,572 B1 * | 5/2001 | Kanjo | 219/110 |
| 6,271,496 B1 | 8/2001 | Domschot | 219/86.8 |
| 6,596,958 B1 | 7/2003 | Chase | 219/86.25 |

* cited by examiner

US 7,145,097 B2

METHOD AND APPARATUS FOR ELECTRICAL RESISTANCE SPOT WELDING USING ELECTRICAL SERVO ACTUATOR

RELATED APPLICATIONS

The present application claims the benefit of U.S. provisional application Ser. No. 60/445,035 filed Feb. 6, 2003.

FIELD OF THE INVENTION

The present invention relates generally to spot welding guns and, more specifically, to welding guns that adjust the spacing of the electrodes during the welding event.

BACKGROUND OF THE INVENTION

U.S. Pat. No. 4,419,558 to Stiebel et al. and an SAE Technical Paper entitled "Monitoring and Control of Spot Weld Operations" by Stiebel et al. describe monitoring and controlling electrical resistance spot-welding by measuring displacements of the electrodes during welding. After the squeezing force is applied by the electrodes to the work pieces and the supply of welding current is initiated, the metal at the work site first expands thermally as it heats (expansion) and then flows plastically as it softens and fuses (indentation). The electrodes are displaced by the expansion and indentation of the metal at the weld site as well as by the expansion and contraction of the electrodes. Thus, measurements of the displacement of the electrodes during formation of the weld provide information indicative of the state of the metal at the weld site.

It has long been known that moderate indentation almost always ensures a good weld. The ability to measure the onset of indentation makes it possible, therefore, to shut off the welding current upon detection of indentation with a high level of assurance that a good weld has been formed. The Stiebel et al. patent and the Stiebel et al. technical paper referred to above are incorporated in their entirety by the foregoing reference to them into the present specification.

In the method and apparatus of the Stiebel patent (and the Stiebel et al. technical paper) consistent measurements of displacement are assured by interposing a mechanical compression spring between the piston of an air cylinder (or its equivalent) that moves the movable electrode into engagement with the work piece and a stationary electrode.

A load cell associated with the spring detects the changes in the load imposed on the spring as the movable electrode is displaced upon expansion and indentation of the metal of the work pieces at the weld site during formation of the weld. Compressing the spring during expansion provides changes in the resulting forces in the spring and thus on the load cells that are directly proportional to the displacement of the movable electrode. Without the spring, for example with a hydraulic or pneumatic cylinder directly working on the movable electrode, the piston is theoretically free to displace with the movable electrode in direct correspondence with the electrode movements, thus providing no change in load and no opportunity to detect electrode displacements by detection of load changes.

U.S. Pat. No. 5,504,297, also to Steibel et al., applied these teachings by providing a pair of opposed electrodes mounted on arms that are fixed against outward displacement during the application of the welding current. One of the arms includes a pneumatic cylinder for moving one of the electrodes to and away from the workpiece. The cylinder includes a piston rod attached to a clutch by a ball screw mechanism. A brake assembly is connected to the unidirectional clutch to prevent outward displacement of the electrodes during expansion of the weld nugget and to permit inward movement of the electrodes to provide indentation of the weld after the nugget softens.

U.S. Pat. No. 5,789,719 to Pary et al. discloses an apparatus for electrical resistance spot welding that includes a pair of opposed electrodes wherein one electrode is movable into contact with a workpiece by actuating a hydraulic cylinder. A pilot operated check valve is provided that permits a one way flow of hydraulic fluid while the weld current is applied. The check valve is operative to prevent movement of the electrode away from the workpiece during expansion of the weld nugget, however, permits inward movement of the electrode after the weld nugget is softened.

SUMMARY OF THE INVENTION

The present invention further improves on the prior art by providing a servo driven spot welder where an electric servo actuator moves at least one of two electrodes to and away from the workpiece. The servo drive allows accurate control of the position of one of the electrodes such that the position may be adjusted during the welding event.

A power source is provided in communication with the welding gun to provide power to the actuator for movement and to the electrodes for welding.

A sensing device may be provided between the servo drive and the electrode for sensing the load on the electrode during the welding event. The sensing device is operative to sense when a weld nugget that forms on the workpiece expands to cause an increase in the load and becomes plastic to cause a decrease in the load. Alternatively, the load on the electrode may be indirectly determined by estimating the load on the servo actuator. For example, a change in current draw of the servo actuator due to the weld nugget expanding and becoming plastic is directly related to the strain on the electrode during the welding event.

A controller communicates with the sensing device and the power source. The controller operates to receive a signal from the sensing device that is indicative of a load change at the electrodes and to stop providing weld power to the electrodes when the weld nugget becomes plastic.

BRIEF DESCRIPTION OF THE DRAWINGS

The present invention will be better understood by reference to the following detailed description in conjunction with the accompanying drawings in which the like reference characters refer to like parts throughout the several views and in which.

DETAILED DESCRIPTION OF THE PREFERRED EMBODIMENTS

Figure 1:
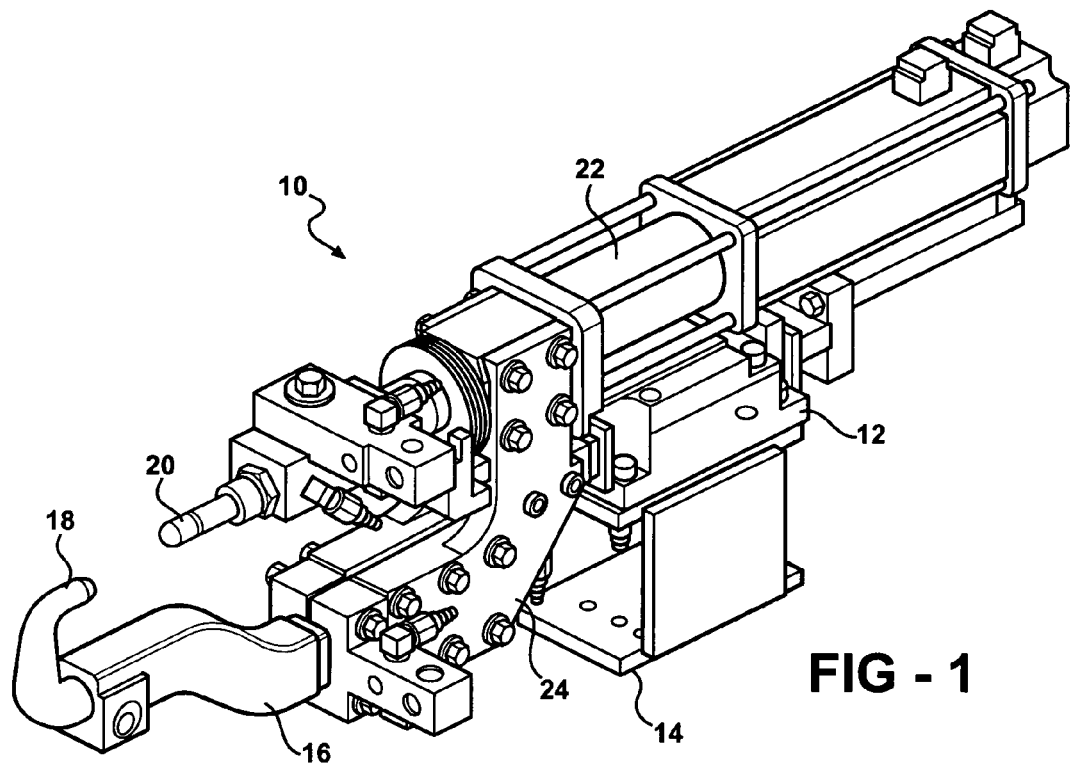
FIG. 1 illustrates a perspective view of the welding gun as according to the invention.
Figure 2:
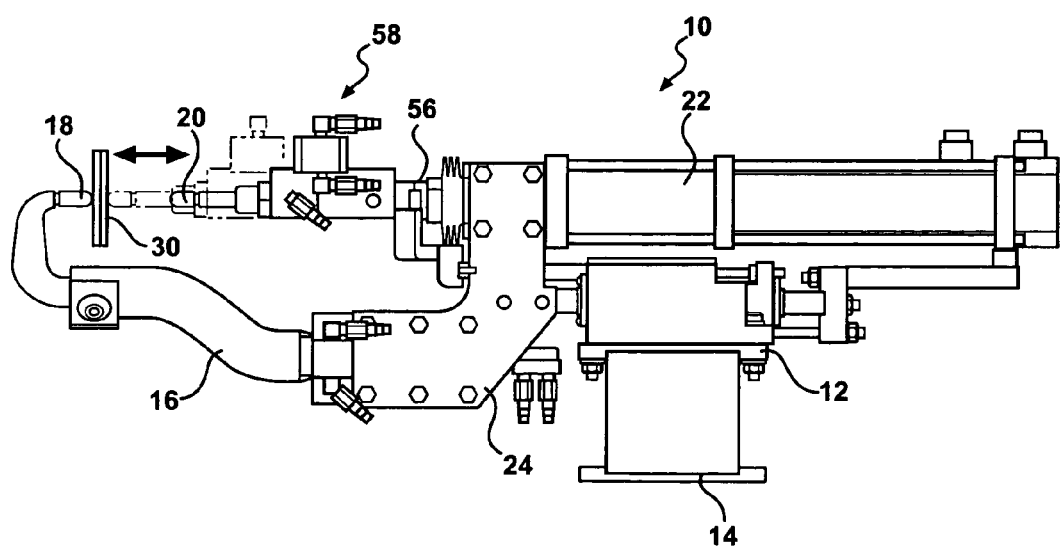
FIG. 2 illustrates a side view of the welding gun of FIG. 1 wherein movement of the electrode is shown.

According to Applicant's U.S. Pat. No. 6,596,958, the entire contents of which are incorporated herein by reference, a modular spot welding gun may be provided that is bolted together from a variety of interchangeable parts. An example of a modular spot welding gun 10 is shown in FIGS. 1 and 2.

The welding gun 10 is generally referred to in the industry as a "C" or straight action-welding gun. The welding gun 10 includes a main frame 12 that may have an integral robot mount 14 for mounting the welding gun 10 to a robot. A lower C-shaped arm 16 holds a first electrode 18. A second electrode 20 is supported by an actuator 22. The actuator 22 moves the second electrode 20 with a "straight action" towards and away from the first electrode 18. This operation is similar to the way in which a C clamp closes by moving one clamping element directly towards an opposite clamping element. Although the following description makes reference to "C" type welding gun of FIG. 1, it is appreciated that other types of welding guns that accomplish spot welding by moving at least one electrode toward the other to close upon the workpiece may be used, which illustratively include pinch and scissors type welding guns.

The actuator 22 in the illustrated embodiment is an electric servo with an internal ball screw or roller screw arrangement and a square cross section rod that acts as an anti-rotate feature. These aspects of the welding gun 10 are discussed in more detail in Applicant's above-identified patent. The present invention may be used with many modular welding gun designs, such as shown in the patent, as well as non-modular designs.

The welding gun 10 is assembled from modular components with the lower C-shaped arm 16 made of bar stock. A lower yoke 24 bolts to the lower arm 16 and interconnects with the frame 12. The frame also supports the actuator 22. The yoke 24 comprises a pair of plates that clamp together with the weld arm 16 trapped therebetween. In this way, the lower arm may be easily unclamped from the yoke 24 and replaced or modified.

Referring to FIG. 2, a work piece 30 is shown positioned against the first electrode 18. The actuator 22 is operable to move the second electrode 20 toward the first electrode 18 until it contacts the work piece 30. A welding event then occurs, with current flowing between the first 18 and second 20 electrodes. As will be described in more detail herein below, the second electrode 20 is held stationary relative to the first electrode 18 during the initial part of the welding event, as the weld nugget is formed and expands. Subsequently, the second electrode 20 may be moved toward the first electrode 18 as the weld nugget softens or becomes plastic, and indentation occurs.

Figure 3:
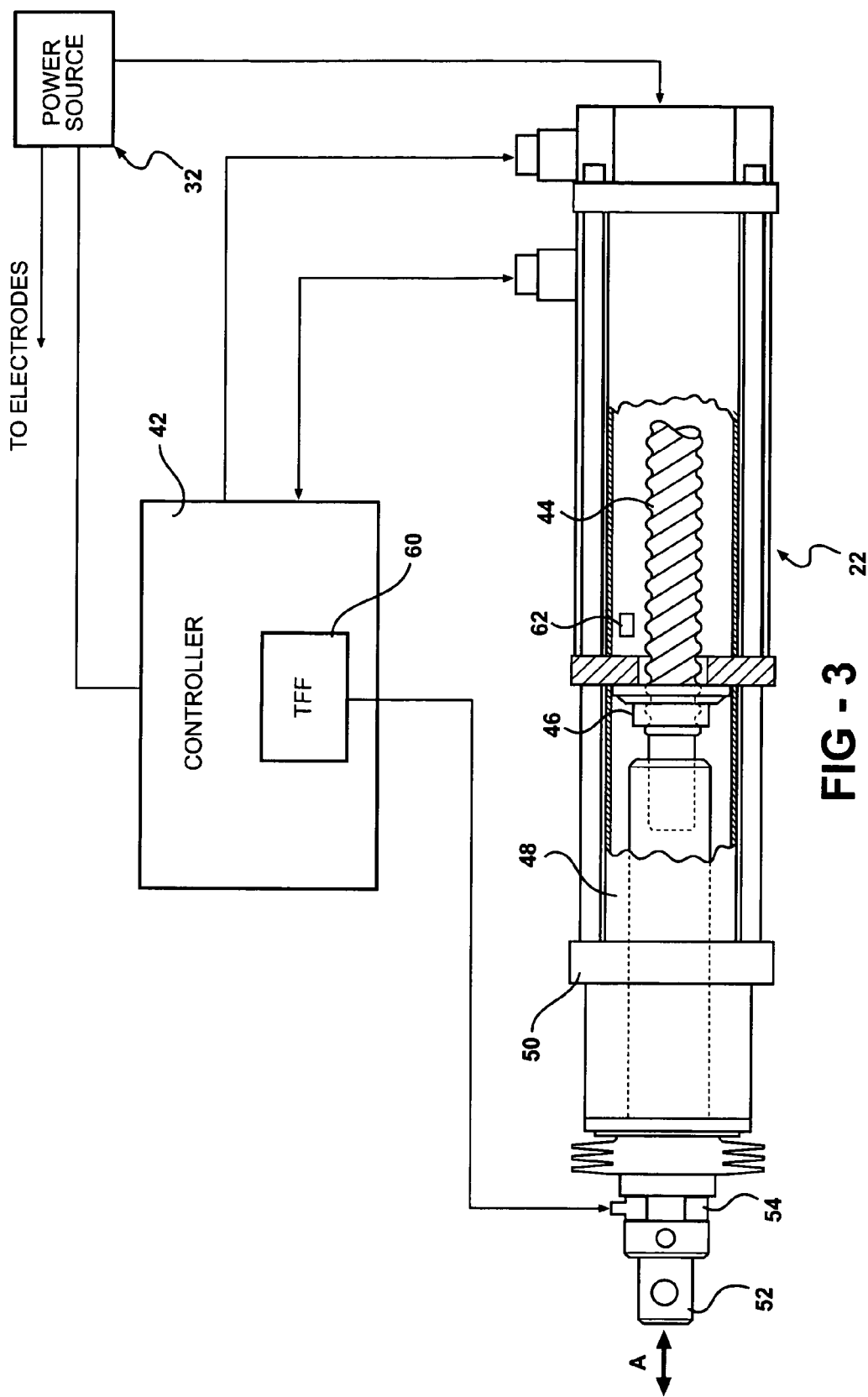
FIG. 3 illustrates a top view of the welding gun of FIG. 1 in communication with a controller.

Referring now to FIG. 3, an actuator 22 is shown in cross-section, with a weld controller 42 illustrated schematically. The actuator 22 is a servo actuator which includes a ball screw drive having a screw rod 44 that threads through a ball nut 46. A motor, not shown, rotates the screw rod 44 such that it translates relative to the nut 46. A servo rod 48 is interconnected with the screw rod 44 such that it translates along with the screw rod 44. Preferably, the servo rod 48 has a square cross-section and passes through a square opening in an end plate 50 in the actuator 22. The combination of the square servo rod 48 and the square opening in the end plate 50 creates an anti-rotate feature such that the moveable end 52 of the actuator 22 does not rotate as it moves along its axis of motion, illustrated by line A. The servo rod 48 and the screw rod 44 are interconnected such that rotary motion of the screw rod 44 does not cause rotary motion of the servo rod 48, but the two rods translate together along the axis of motion A. Alternatively, the actuator 22 may be constructed such that the ball nut 46 is rotated with respect to a stationary screw rod 44 to cause movement of the servo rod 48. Also, a roller screw design may be substituted for the illustrated ball screw design.

According to one embodiment of the present invention, a load sensor 54 is provided close to the drive end 52 of the actuator 22 so as to sense strain on the end 52. One of the electrodes is mounted on the end 52. This arrangement may also be seen in FIG. 2, where the actuator 22 includes a load sensor 56. An electrode assembly 58 is mounted to the end 52 of the actuator 22, and includes the electrode 20, as well as connecting points for the current supply. In use, the sensor 54 or 56 may be operable to sense the strain, load, or pressure on an electrode. The sensor 54 communicates with the weld controller 42. The weld controller 42 may include a software or hardware module specifically designed to communicate with the load sensor 54. This is indicated as "TFF" at 60. This stands for "Thermal-Force Feedback." As an alternative, the load sensor 54 may be positioned by the stationary electrode.

The load sensor 54 may be of any suitable type such as a piezoelectric strain gauge, and sends a signal indicating the load on the electrode. The weld nugget expands when being heated by the electrodes causing an increase in the load on the electrode due to the pressure exerted by the expansion of the weld nugget. Unlike with a hydraulic or pneumatic cylinder, the servo actuator is not easily back-driven by the increased load. When the weld nut softens or becomes plastic, the load is reduced, which in turn is sensed by the load sensor 54.

The weld controller 42 has a master control logic that controls the extension and retraction of the actuator 22 and the application of welding current to the electrodes. According to one embodiment of the present invention, it is preferable to bring the electrodes together so as to apply a predetermined squeezing force on the workpiece. The position of the electrodes after then squeezing force has been applied may be referred to as a contact position. A welding current is then applied and a weld nugget is formed. During expansion of the weld nugget, the load on the electrode increases, but the electrodes are preferably held in place, in the contact position, by the servo actuator 22. As will be clear to those of skill in the art, the additional load on the electrodes from the weld nugget expansion may cause some deflection of the welding gun components. Therefore, the electrodes may be move apart slightly from the contact position. However, for purposes of this application, this slightly spread position is considered to still be substantially the contact position.

The load sensor produces a signal that indicates an increase in load during expansion of the weld nugget. The force output of the actuator 22 may be increased by the controller to counteract the pressure exerted by the weld nugget. Expansion of the weld nugget is followed by softening and indentation stage, at which point the load sensed by the load sensor is reduced and an appropriate signal is transmitted to the controller 42. The controller may then cause the welding current to be shut off, either immediately, or at a predetermined interval after the weld nugget softens or becomes plastic. As an alternative, the weld controller may additionally move the electrodes closer together, with respect to the contact position, upon receiving a signal from the load sensor that softening of the weld nugget has occurred, thus allowing the electrodes to continue contacting the weld nugget during contraction and indentation.

According to an alternative embodiment of the present invention, the load sensor by the electrode may be eliminated, with the load on the electrodes instead being determined by monitoring the conditions of the servo actuator 22. As will be known to those of skill in the art, the load on the electrodes may be determined directly by sensing the current draw of the servo actuator 22. In this case, the current sensor, which may form part of the servo control electronics, may be considered to be the load sensor. The load on the servo actuator may be indirectly determined in other ways as well.

Illustratively, a position sensor may be used in place of the load sensor for detecting a change in position of the at least one movable electrode when the weld nugget expands and becomes plastic. A position sensor is schematically shown at 62 in FIG. 3. As known to those of skill in the art, a position sensor for determining the relative or absolute position of the servo rod 48, and, therefore, the electrode, may be implemented in a number of ways. For example, a linear or rotary encoder or resolver may be used. If a rotary encoder is used, it may sense the rotor position of the motor that forms a portion of the actuator, a gear, the screw rod, or the nut. A linear encoder may be used to directly sense the linear position of the rod 48. In each case, the position sensing may be relative or absolute.

The expansion of the weld nugget will increase the force on the electrode to cause the electrode to experience negative movement or to be moved backward. Thereafter when the weld nugget becomes plastic, the force on the electrode will decrease such that the electrode may experience positive movement or be moved forward. The position sensor is operative to detect the backward movement of the electrode when the weld nugget expands and operates to send a signal to the controller 42 to control the power supply 32 to increase current to the servo actuator 22 such that backward movement is prevented. When the weld nugget becomes plastic or softens, the increased current will urge the electrode to move forward. The forward movement of the electrode is sensed by the position sensor which sends a signal to the controller 42 indicative of the forward movement whereby the controller 42 then operates to control the power supply 32 to stop providing weld power to the electrodes. Additionally, the controller 42 may be adapted to control the servo actuator 22 to move the electrode forward after the weld nugget becomes plastic such that the electrodes continue to contact the workpiece.

The operation of the welding gun according to this alternative embodiment, during the welding event, may be substantially the same as in the embodiment including the load sensor. The electrodes are brought together so as to apply a predetermined squeezing force on the workpiece, with the squeezing force being indirectly determined by the load on the servo actuator. The servo actuator may then hold the electrodes in place during the flow of current and expansion of the weld nugget. The increasing load on the electrodes may be directly sensed by the load sensor or indirectly via the servo actuator. As softening occurs, the load on the servo will be decreased, and current flow may be terminated by the controller, with or without the electrodes being moved inwardly during the softening.

As will be clear to those of skill in the art, the present invention may be adapted and modified in various ways without departing from the intent or scope of the present invention.

We claim:

1. A welding gun for spot welding a workpiece whereupon a weld nugget is formed that expands and then becomes plastic during the spot welding process, the welding gun comprising:

two electrodes, at least one electrode being movable with respect to the other electrode;

a power source operative to provide welding power to the electrodes for forming the weld nugget;

an electric servo actuator operative to move the at least one movable electrode toward the other electrode such that the electrodes contact opposite sides of the workpiece, the actuator operative to apply a predetermined amount of force to the workpiece;

a force sensor in communication with at least one of the two electrodes, the force sensor operative to detect an increase in force on the at least one electrode when the weld nugget expands and a decrease in force when the weld nugget becomes plastic, the force sensor further operative to produce a signal indicative of the increase and decrease in force; and a controller in communication with the force sensor and the power source, the controller operative to receive the signal from the force sensor and to cause the power source to stop providing welding power to the electrodes after the force sensor detects the decrease in force due to the weld nugget becoming plastic;

wherein the gun does not include a brake operable to prevent the actuator from being back driven.

2. The welding gun of claim 1, wherein the controller immediately causes the power source to stop providing welding power to the electrodes when the force sensor detects the decrease in force.

3. The welding gun of claim 1, wherein the controller is further in communication with the servo actuator and operative to control the servo actuator so as to control movement of the at least one movable electrode in response to receiving the signal from the force sensor.

4. The welding gun of claim 3, wherein the controller is further operative to cause the electrodes to continue contacting the weld nugget when the weld nugget becomes plastic.

5. The welding gun of claim 3, wherein the controller is further operative to cause the actuator to move the at least one movable electrode toward the other electrode when the weld nugget becomes plastic.

6. The welding gun of claim 1, wherein the controller is further operative to cause the electric servo actuator to apply increased force to the workpiece when the force sensor indicates an increase in force due to the weld nugget expansion.

7. The welding gun of claim 1, wherein a contact position is defined as the position of the movable electrode when the electrodes contact the workpiece and the predetermined amount of force is applied to the workpiece, the actuator being further operative to substantially maintain the contact position when the weld nugget expands.

8. The welding gun of claim 1, wherein a contact position is defined as the position of the movable electrode when the electrodes contact the workpiece and the predetermined amount of force is applied to the workpiece, the welding gun further comprising a position sensor for sensing the position of the at least one movable electrode, the position sensor operative to detect a negative change in position when the at least one movable electrode moves away from the other electrode and a positive change in position when the at least one movable electrode moves toward the other electrode, the position sensor further operative to produce a signal indicative of the negative or positive change in position, the controller further being in communication with the position sensor and the actuator, the controller further being operative to substantially maintain the contact position when the weld nugget expands.

9. The welding gun of claim 1, wherein the force sensor comprises a current sensor operable to sense a current draw of the electric servo actuator.

10. A welding gun for spot welding a workpiece whereupon a weld nugget is formed that expands and then becomes plastic during the spot welding process, the welding gun comprising:
two electrodes, at least one electrode being movable with respect to the other electrode;
a power source operative to provide welding power to the electrodes for forming the weld nugget;
an electric servo actuator operative to move the at least one movable electrode toward the other electrode such that the electrodes contact opposite sides of the workpiece, the actuator operative to apply a predetermined amount of force to the workpiece, a contact position being defined as the position of the movable electrode when the electrodes contact the workpiece and the predetermined amount of force is applied to the workpiece;
a position sensor for sensing the position of the at least one movable electrode, the position sensor operative to detect a negative change in position when the at least one movable electrode moves away from the other electrode and a positive change in position when the at least one movable electrode moves toward the other electrode, the position sensor further operative to produce a signal indicative of the negative or positive change in position; and
a controller in communication with the position sensor, the actuator, and the power source, the controller operative to receive the signal from the position sensor and to cause the actuator to apply an increased amount of force to the workpiece when the position sensor detects a negative change in position relative to the contact position, the controller further operable to cause the power source to stop providing welding power to the electrodes when the position sensor detects a positive change in position relative to the contact position.

11. The welding gun of claim 10, wherein the controller immediately causes the power source to stop providing welding power to the electrodes when the position sensor detects the positive change in position relative to the contact position.

12. The welding gun of claim 10, wherein the controller is further operative to cause the electrodes to continue contacting the weld nugget when the weld nugget becomes plastic.

13. The welding gun of claim 10, wherein the controller is further operative to cause the actuator to move the at least one movable electrode toward the other electrode when the weld nugget becomes plastic.

14. A method of spot welding a workpiece whereupon a weld nugget is formed that expands and then becomes plastic during the spot welding process, the method comprising the steps of:
providing a welding gun having two electrodes wherein at least one electrode is movable with respect to the other electrode;
providing a power source in communication with the two electrodes wherein the power source is operative to provide welding power to the electrodes for forming the weld nugget;
providing an electric servo actuator that is operative to cause the at least one movable electrode to move toward and away from the other electrode;
providing a force sensor in communication with at least one of the two electrodes for detecting the force on the electrode;
providing a controller in communication with the force sensor and the power source;
positioning the workpiece between the electrodes;
moving the movable electrode towards the other electrode until the electrodes contact opposite sides of the workpiece;
utilizing the actuator to apply a predetermined amount of force to the workpiece with the electrodes such that the electrodes are positioned in a contact position;
providing welding power to the electrodes such that a weld nugget is formed between the electrodes and expands and then becomes plastic;
sensing the force on the electrode;
maintaining the electrodes substantially in the contact position while the weld nugget expands; and
controlling the power source via the controller to stop providing power to the electrodes after the force sensor detects a decrease in force due to the weld nugget becoming plastic;
wherein the gun does not include a brake operable to prevent the actuator from being back driven.

15. The method of claim 14, further comprising the step of moving the at least one movable electrode towards the other electrode when the force sensor detects the decrease in force due to the weld nugget becoming plastic.

16. The method of claim 14, wherein the maintaining step comprises utilizing the actuator to increase the force applied to the workpiece by the electrodes while the weld nugget expands.

17. The welding gun of claim 14, wherein the force sensor comprises a current sensor operable to sense a current draw of the electric servo actuator.

18. A method of spot welding a workpiece whereupon a weld nugget is formed that expands and then becomes plastic during the spot welding process, the method comprising the steps of:
providing a welding gun having two electrodes wherein at least one electrode is movable with respect to the other electrode;
providing a power source in communication with the two electrodes wherein the power source is operative to provide welding power to the electrodes for forming the weld nugget;
providing an electric servo actuator that is operative to cause the at least one movable electrode to move toward and away from the other electrode;
providing a position sensor for sensing the position of the at least one movable electrode;
providing a controller in communication with the position sensor and the power source;
positioning the workpiece between the electrodes;
moving the movable electrode towards the other electrode until the electrodes contact opposite sides of the workpiece;
utilizing the actuator to apply a predetermined amount of force to the workpiece with the electrodes such that the electrodes are positioned in a contact position;
providing welding power to the electrodes such that a weld nugget is formed between the electrodes and expands and then becomes plastic;
sensing the position of the movable electrode;
maintaining the electrodes substantially in the contact position while the weld nugget expands and allowing the electrodes to move towards each other when the weld nugget becomes plastic; and controlling the power source via the controller to stop providing power to the electrodes after the position sensor detects the electrodes move towards one another from the contact position when the weld nugget becomes plastic.

19. The method of claim 18, wherein the maintaining step comprises utilizing the actuator to increase the force applied to the workpiece by the electrodes while the weld nugget expands.

* * * * *